United States Patent
Shirotori et al.

(10) Patent No.: US 8,780,500 B2
(45) Date of Patent: Jul. 15, 2014

(54) MICROWAVE-ASSISTED MAGNETIC RECORDING HEAD, METHOD OF MANUFACTURING THE SAME, MAGNETIC HEAD ASSEMBLY USING THE SAME, AND MAGNETIC RECORDING/REPRODUCTION APPARATUS

(71) Applicants: Kabushiki Kaishan Toshiba, Tokyo (JP); TDK Corportation, Tokyo (JP)

(72) Inventors: Satoshi Shirotori, Yokohama (JP); Katsuhiko Koui, Yokohama (JP); Shinobou Sugimura, Yokohama (JP); Norihito Fujita, Fuchu (JP); Akihiki Takeo, Kokubunji (JP); Min Li, Fremont, CA (US); Ruhang Ding, Pleasanton, CA (US)

(73) Assignees: Kabushiki Kaisha Toshiba, Tokyo (JP); TDK Corporation, Tokyo (JP)

( * ) Notice: Subject to any disclaimer, the term of this patent is extended or adjusted under 35 U.S.C. 154(b) by 0 days.

(21) Appl. No.: 13/752,812

(22) Filed: Jan. 29, 2013

(65) Prior Publication Data
US 2014/0078620 A1    Mar. 20, 2014

(30) Foreign Application Priority Data
Sep. 20, 2012 (JP) ................. 2012-207565

(51) Int. Cl.
*G11B 5/127* (2006.01)

(52) U.S. Cl.
USPC ..................................... 360/125.3

(58) Field of Classification Search
CPC ............ G11B 5/127; G11B 5/48; G11B 5/17; G11B 5/187; G11B 20/12; G11B 20/1217
USPC ................ 360/125.3, 125.13, 125.5, 125.03, 360/125.09, 125.04, 125.12, 125.17, 360/125.16, 125.06
See application file for complete search history.

(56) References Cited

U.S. PATENT DOCUMENTS

| | | | | |
|---|---|---|---|---|
| 4,772,976 | A * | 9/1988 | Otomo et al. | 360/125.01 |
| 8,300,356 | B2 | 10/2012 | Zhang et al. | |
| 8,559,123 | B2 * | 10/2013 | Hirata et al. | 360/48 |
| 8,614,861 | B1 * | 12/2013 | Tomoda et al. | 360/125.3 |
| 2010/0000965 | A1 | 1/2010 | Kamata et al. | |

(Continued)

FOREIGN PATENT DOCUMENTS

| | | |
|---|---|---|
| JP | 2966620 B | 8/1999 |
| JP | 2009-170007 A | 7/2009 |
| JP | 2011-090767 A | 5/2011 |
| JP | 2011-238932 A | 11/2011 |

*Primary Examiner* — Allen T Cao
(74) *Attorney, Agent, or Firm* — Knobbe, Martens, Olson & Bear LLP

(57) ABSTRACT

According to one embodiment, a magnetic recording head manufacturing method includes forming a spin torque oscillator layer on a main magnetic pole layer, forming a mask on the spin torque oscillator layer, processing the spin torque oscillator layer by performing ion beam etching through the mask, and partially modifying the main magnetic pole layer through the mask. The partially modifying the main magnetic pole layer makes it possible to decrease the saturation flux density of the main magnetic pole layer in the modified portion, and form an unmodified main magnetic pole portion covered with the mask, and a modified portion around the main magnetic pole.

10 Claims, 4 Drawing Sheets

(56) References Cited

U.S. PATENT DOCUMENTS

| | | |
|---|---|---|
| 2011/0090603 A1 | 4/2011 | Bai |
| 2011/0279921 A1 | 11/2011 | Zhang et al. |
| 2011/0304939 A1* | 12/2011 | Hirata et al. ............. 360/110 |
| 2012/0236431 A1* | 9/2012 | Hirata et al. ............. 360/70 |
| 2012/0320474 A1* | 12/2012 | Soeno et al. ............. 360/319 |
| 2013/0329316 A1* | 12/2013 | Watanabe et al. ....... 360/78.04 |
| 2013/0329317 A1* | 12/2013 | Yamada et al. .......... 360/78.04 |
| 2014/0002925 A1* | 1/2014 | Tomoda et al. .......... 360/99.08 |

* cited by examiner

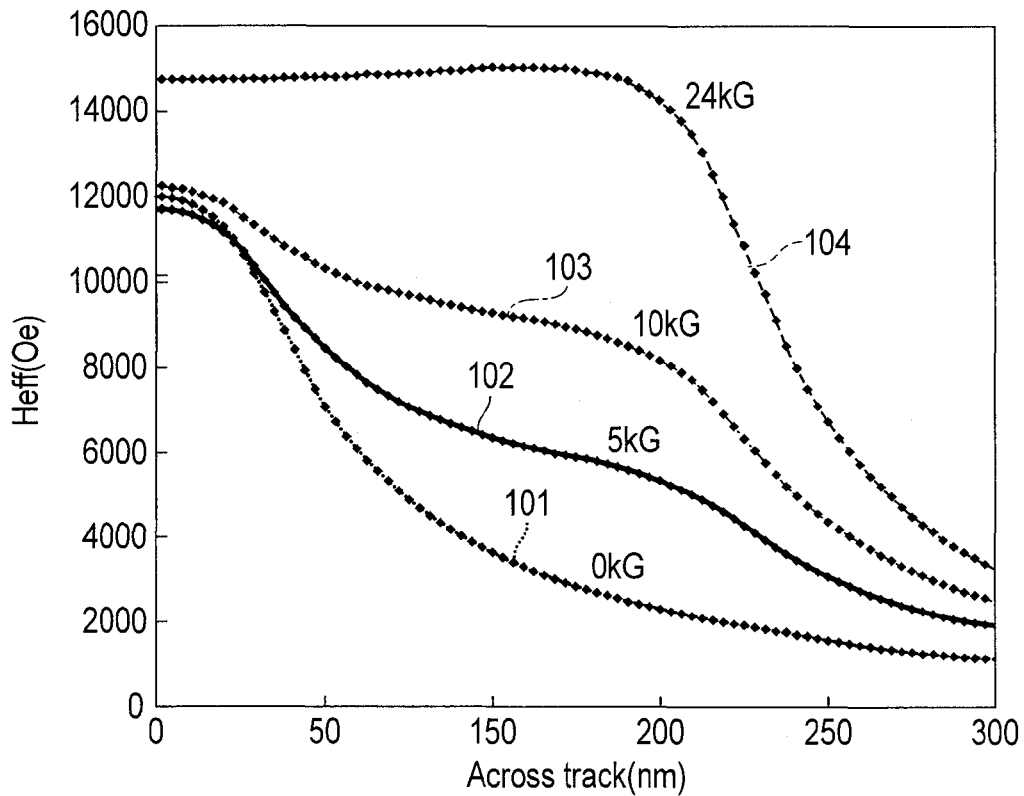
F I G. 3
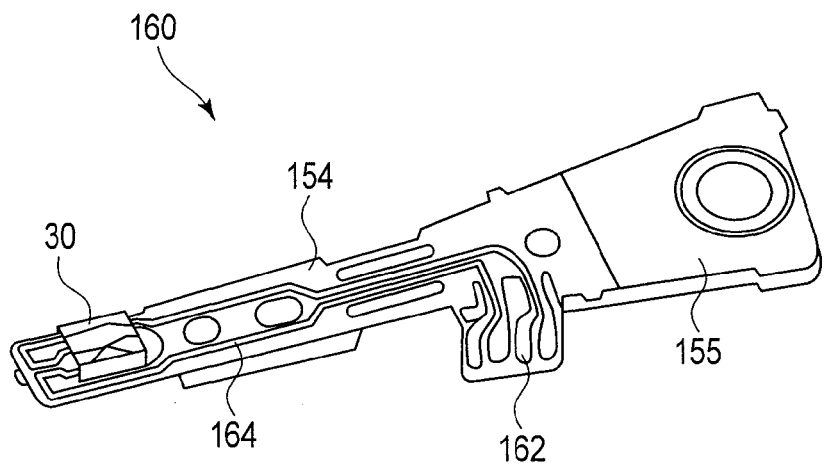
F I G. 4

MICROWAVE-ASSISTED MAGNETIC RECORDING HEAD, METHOD OF MANUFACTURING THE SAME, MAGNETIC HEAD ASSEMBLY USING THE SAME, AND MAGNETIC RECORDING/REPRODUCTION APPARATUS

CROSS-REFERENCE TO RELATED APPLICATIONS

This application is based upon and claims the benefit of priority from Japanese Patent Application No. 2012-207565, filed Sep. 20, 2012, the entire contents of which are incorporated herein by reference.

FIELD

Embodiments described herein relate generally to a microwave-assisted magnetic recording head, a method of manufacturing the same, a magnetic head assembly using the same, and a magnetic recording/reproduction apparatus.

BACKGROUND

In a microwave-assisted magnetic recording (MAMR) head manufactured by aligning a main magnetic pole and a spin torque oscillator (STO) by self-alignment, the positions of the main magnetic pole and STO must be aligned. However, if the main magnetic pole is processed by ion beam etching (IBE) together with the STO by self-alignment, an etched high-Bs main magnetic pole material is redeposited on the sidewalls of the STO. The redeposited main magnetic pole material significantly suppresses the oscillation of the STO. On the other hand, if the redeposited main magnetic pole material is completely removed by IBE, damages to the STO layer and the shape deterioration of the STO are significant.

BRIEF DESCRIPTION OF THE DRAWINGS

FIG. 3 is a graph showing examples of the fringe characteristic of the magnetic recording head according to the embodiment;

FIG. 4 is an exemplary view showing a magnetic head assembly according to the embodiment;

DETAILED DESCRIPTION

In general, a magnetic recording head manufacturing method according to an embodiment includes the steps of forming a spin torque oscillator layer on a main magnetic pole layer, forming a mask on the spin torque oscillator layer, processing the spin torque oscillator layer by performing ion beam etching through the mask, and partially modifying the main magnetic pole layer through the mask. The step of partially modifying the main magnetic pole layer makes it possible to decrease the saturation flux density of the main magnetic pole layer in the modified portion, and form an unmodified main magnetic pole portion covered with the mask, and a modified portion around the main magnetic pole.

A magnetic recording head according to the embodiment includes a main magnetic pole portion, a modified portion formed around the main magnetic pole portion, and a spin torque oscillator layer formed on the main magnetic pole portion. In the modified portion, the same material as that of the main magnetic pole portion is modified by using at least one ion selected from the group consisting of fluorine, chlorine, bromine, oxygen, nitrogen, and boron such that the saturation flux density decreases.

A magnetic head assembly according to the embodiment includes the above-mentioned magnetic recording head, a head slider on which the magnetic recording head is mounted, a suspension having one end on which the head slider is mounted, and an actuator arm connected to the other end of the suspension.

A magnetic recording/reproduction apparatus according to the embodiment includes a magnetic recording medium, and the above-mentioned magnetic head assembly.

The embodiment will be explained below with reference to the accompanying drawings.

Figure 1:
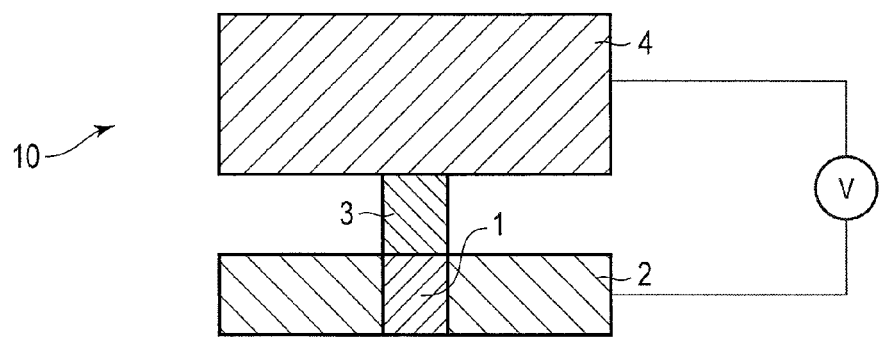
FIG. 1 is an exemplary view showing a magnetic recording head according to an embodiment.

FIG. 1 is an exemplary view showing the magnetic recording head according to the embodiment.

FIG. 1 shows an arrangement in which a microwave-assisted magnetic recording head 10 is viewed from an air bearing surface (ABS).

As shown in FIG. 1, the microwave-assisted magnetic recording head 10 according to the embodiment includes a main magnetic pole (MP) layer 1, a modified portion 2 formed around the main magnetic pole layer 1, and a spin torque oscillator (STO) layer 3 formed on the main magnetic pole layer 1. The main magnetic pole layer 1 and STO layer 3 are aligned by self-alignment, and have almost equal widths. The modified portion 2 is formed around the main magnetic pole layer 1, and contains the same material as that of the main magnetic pole layer 1 and at least one type of ion selected from the group consisting of O, F, N, B, Cl, and Br and implanted into the above-mentioned material.

A write shield 4 for forming a magnetic circuit together with the main magnetic pole layer 1 is further formed on the STO layer 3.

The modified portion 2 and main magnetic pole layer 1 are different in Bs, and the modified portion 2 having a smaller Bs is formed outside the main magnetic pole layer 1. Recording can be performed without deteriorating the fringe characteristic by decreasing the Bs of the main magnetic pole material outside the width of the STO layer 3 to such an extent that no magnetic recording can be performed on a magnetic recording medium.

Also, in the microwave-assisted magnetic recording head 10, the STO layer 3 is patterned, but the main magnetic pole layer 1 is not patterned. In the embodiment, the modified portion 2 is formed by modifying, instead of etching, a region of the main magnetic pole layer 1, which is outside the width of the STO layer 3. Therefore, it is possible to avoid the redeposition of the main magnetic pole material to the STO sidewalls by etching, and hence avoid the suppression of stable oscillation of the STO.

FIGS. 2A, 2B, 2C, 2D, and 2E are views showing a method of manufacturing the microwave-assisted magnetic recording head according to the embodiment.

Figure 2A:
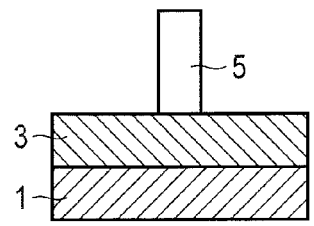
FIGS. 2A, 2B, 2C, 2D, and 2E are views showing a method of manufacturing the magnetic recording head according to the embodiment.

As shown in FIG. 2A, a main magnetic pole layer 1 is first deposited.

As the main magnetic pole material, a soft magnetic material having a high Bs can be used. For example, an FeCo alloy has been put into practical use as a material having the highest Bs among general alloy metals.

Then, an STO layer 3 is deposited. The STO layer 3 can include a spin injection layer, interlayer, and oscillation layer formed in this order from the main magnetic pole layer 1 to a write shield. The STO layer 3 can further include an underlayer formed between the spin injection layer and main magnetic pole, and a cap layer formed between the write shield and oscillation layer.

As the oscillation layer, it is possible to use, e.g., an FeCoAl alloy having magnetic anisotropy in the in-plane direction. It is also possible to use a material obtained by adding at least one of Si, Ge, Mn, Cr, and B. This makes it possible to adjust the Bs, Hk (anisotropic magnetic field), and spin torque transfer efficiency between the oscillation layer and spin injection layer.

As the interlayer, it is possible to use a material having a high spin transmittance, e.g., Cu, Au, or Ag. The thickness of the interlayer can be one atomic layer to 3 nm. Consequently, exchange coupling between the oscillation layer and spin injection layer can be controlled to an optimal value.

As the spin injection layer, it is possible to use materials having high perpendicular alignment, e.g., CoCr-based magnetic layers having magnetization aligned in the direction perpendicular to the film surfaces such as CoCrPt, CoCrTa, CoCrTaPt, and CoCrTaNb, RE-TM-based amorphous alloy magnetic layers such as TbFeCo, Co artificial lattice magnetic layers such as Co/Pd, Co/Pt, and CoCrTa/Pd, CoPt-based and FePt-based alloy magnetic layers, and SmCo-based alloy magnetic layers; soft magnetic layers having a relatively high saturation flux density and magnetic anisotropy in the in-plane direction such as CoFe, CoNiFe, NiFe, CoZrNb, FeN, FeSi, and FeAlSi; a Heusler alloy selected from the group consisting of, e.g., CoFeSi, CoMnSi, and CoMnAl; and a CoCr-based magnetic alloy film having magnetization aligned in the in-plane direction. It is also possible to use a material obtained by stacking a plurality of materials described above.

As the underlayer and cap layer, it is possible to use non-magnetic metal materials having low electrical resistances, e.g., Ti, Cu, Ru, and Ta.

Subsequently, a mask for obtaining the shape of the STO and main magnetic pole is formed. Although a photoresist or the like is used as the mask, it is also possible to use a hard mask made of, e.g., C, Si, Al, or an oxide or nitride of C, Si, or Al.

Figure 2B:
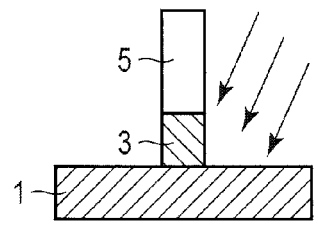

Then, as shown in FIG. 2B, an unmasked portion of the STO layer 3 is removed by using IBE. If the unmasked portion of the STO layer is demagnetized by ion implantation, the diffusion of implanted ions blurs the boundary between the masked and unmasked portions. Since this suppresses the uniform oscillation of the STO and increases a driving current for oscillation, IBE must be used. For example, IBE is performed at an acceleration voltage of 200 to 400 V and a beam angle of 50°.

Figure 2C:
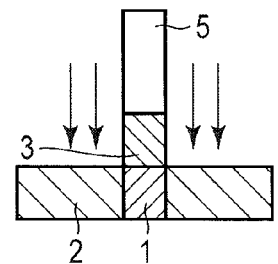

Furthermore, as shown in FIG. 2C, the main magnetic pole layer 1 is modified through the mask by using ion implantation, thereby forming a modified portion 2.

In this modification, it is unnecessary to completely demagnetize the main magnetic pole layer 1, and the saturation flux density Bs need only be decreased to such an extent that no recording can be performed on a recording medium.

FIG. 3 shows examples of the fringe characteristic of the magnetic recording head obtained by simulation when the ion implantation dose is changed for modification.

In FIG. 3, reference numeral 101 denotes the characteristic when the Bs of the modified portion 2 is 0 kG; 102, the characteristic when the Bs of the modified portion 2 is 5 kG; 103, the characteristic when the Bs of the modified portion 2 is 10 kG; and 104, the characteristic when the Bs of the modified portion 2 is 24 kG.

The ordinate indicates an effective field intensity applied to a recording track, and the abscissa indicates the distance from the recording track. As shown in FIG. 3, as the Bs of the modified portion 2 is decreased, the effective field intensity on an adjacent track can be suppressed.

In a presently generally used CoCr-based perpendicular recording medium, an irreversible reversal magnetic field is about 3,000 Oe, so the effective field intensity on an adjacent track is desirably about 3,000 Oe or less. When an adjacent track exists at a distance of, e.g., 200 nm, the effective field intensity on the adjacent track can be suppressed to about 3,000 Oe by decreasing the Bs of the main magnetic pole layer to 5 kG. Accordingly, the modification by ion implantation can decrease the Bs to 5 kG or less. However, this does not apply to the fringe characteristic because it changes in accordance with the material of a recording medium, the arrangement of a recording head, and the position (recording density) of an adjacent track.

Examples of the ion for use in ion implantation are halogen ions (e.g., fluorine, chlorine, and bromine), oxygen, nitrogen, and boron. In ion implantation, modification can be performed by about 50 to 100 nm in the depth direction at an acceleration voltage of about 10 to 30 keV. However, it is difficult to obtain a mask resistance to such an extent that no damage is inflicted on the STO.

From the foregoing, this main magnetic pole modification step can be combined with RIE (Reactive Ion Etching). For example, when using an ICP (Inductively Coupled Plasma) apparatus or ECR (Electron Cyclotron Resonance) apparatus, the main magnetic pole layer can be modified by using a thin ion implantation mask because the STO can be protected by thin Ru or Ta used as the cap layer of the STO. For example, modification of 10 nm can be performed in the depth direction by applying a substrate bias of 100 W when using the ICP apparatus, and applying an acceleration voltage of 1 keV when using the ECR apparatus. In addition, when performing modification by RIE, mask removal can be performed at the same time. As described above, the main magnetic pole can be modified without inflicting any damage to the STO by combining ion implantation and RIE.

Figure 2D:
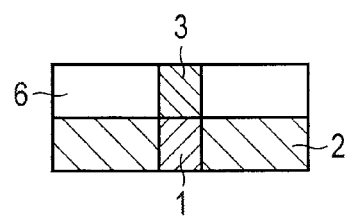

Then, as shown in FIG. 2D, the STO is buried, and a planarization process is performed, thereby forming a polarizing layer 6. An insulating oxide such as $SiO_2$ or $Al_2O_3$ can be used in the burying process. A side shield can also be formed by using a shield material such as FeCoNi. Although CMP (Chemical Mechanical Polishing) can be used as the planarization process, planarization may also be performed using ion beam etching.

Figure 2E:
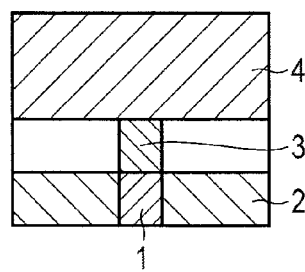

Finally, as shown in FIG. 2E, FeCoNi or the like is deposited as a write shield 4.

Thus, the microwave-assisted magnetic recording head 10 according to the embodiment is obtained.

FIG. 4 is an enlarged perspective view in which a magnetic head assembly formed ahead of an actuator arm 155 is viewed from the disk side.

That is, a magnetic head assembly 160 includes the actuator arm 155 including a bobbin for holding a driving coil or the like, and a suspension 154 is connected to one end of the actuator arm 155.

A head slider 30 including the magnetic recording head 10 is attached to the distal end of the suspension 154. The suspension 154 includes lead wires 164 for signal write and read. The lead wires 164 are electrically connected to electrodes of the magnetic head assembled in the head slider 30.

Figure 5:
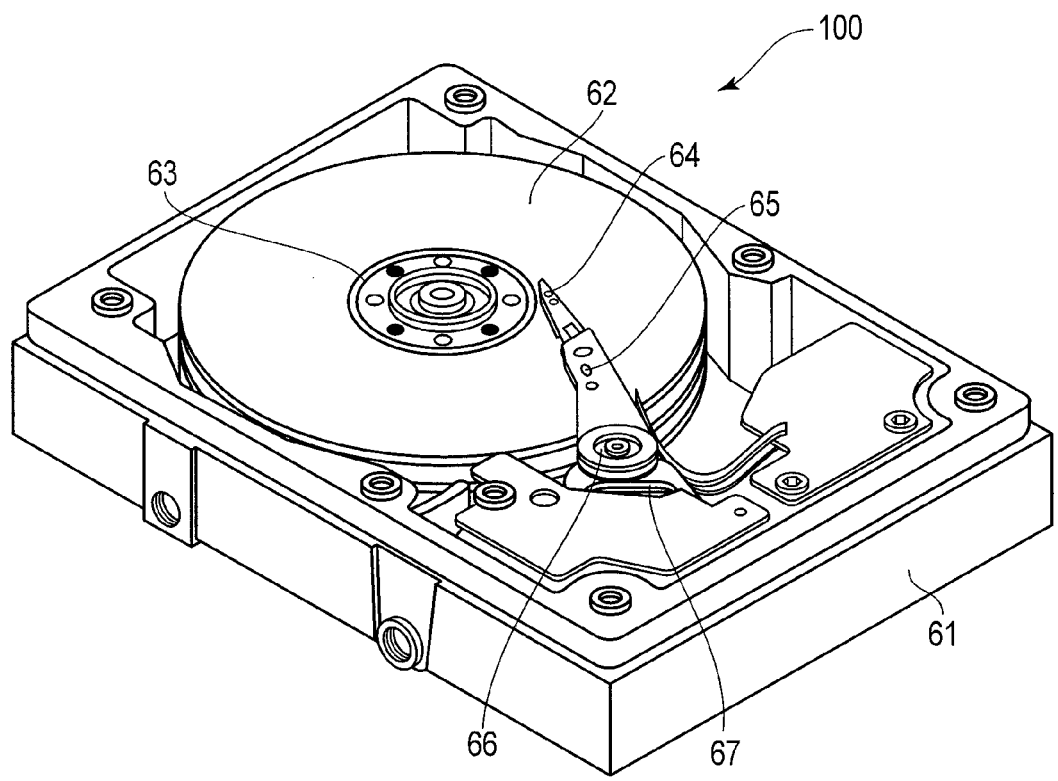
FIG. 5 is a partially exploded perspective view showing an example of a magnetic recording/reproduction apparatus according to the embodiment.

FIG. 5 is a partially exploded perspective view showing an example of a magnetic recording/reproduction apparatus according to the embodiment.

The magnetic recording/reproduction apparatus according to the embodiment includes the above-described magnetic head and a perpendicular magnetic recording medium.

In a magnetic recording/reproduction apparatus 100 according to the embodiment, a rigid magnetic disk 62 for recording information is fitted on a spindle 63 and rotated at a predetermined rotational speed by a spindle motor (not shown). A slider 64 on which the recording head according to the embodiment which records information by accessing the magnetic disk 62 and an MR head for reproducing information are mounted is attached to the distal end of a suspension 65 formed by a thin leaf spring. The suspension 65 is connected to one end of an arm 66 including a bobbin for holding a driving coil (not shown).

A voice coil motor 67 as a kind of a linear motor is formed at the other end of the arm 66. The voice coil motor 67 includes the driving coil (not shown) wound on the bobbin of the arm 66, and a magnetic circuit including a permanent magnet and counter yoke arranged to oppose each other so as to sandwich the driving coil.

The arm 66 is held by ball bearings (not shown) formed in two, upper and lower portions of a fixed shaft, and rotated by the voice coil motor 67. That is, the voice coil motor 67 controls the position of the slider 64 on the magnetic disk 62. Note that reference numeral 61 in FIG. 5 denotes a housing.

The magnetic recording/reproduction apparatus according to the embodiment can further include a signal processor for performing signal write and read on the magnetic recording medium by using the magnetic recording head mounted on the magnetic head assembly.

The embodiment will be explained in more detail below by way of its examples.

EXAMPLE 1

A microwave-assisted magnetic recording head was manufactured by using the method as shown in FIGS. 2A, 2B, 2C, 2D, and 2E. The STO and main magnetic pole pattern formation conditions will be described below.

First, a hard mask containing 200-nm thick C and 10-nm thick Si was used as a mask for obtaining the shape of an STO and main magnetic pole. The hard mask was transferred by forming a pattern by using a photoresist, processing the Si layer based on the pattern by RIE using $CF_4$ gas, and processing the C layer by RIE using oxygen gas by using the Si layer as a mask.

Then, an STO was formed by using IBE. This IBE of the STO layer was performed at an acceleration voltage of 300 V and a beam angle of 50°, and etching was continued until an underlayer of the STO was detected by using an SIMS (Secondary Ion-microprobe Mass Spectrometer).

After that, ion implantation was performed on the main magnetic pole layer by using nitrogen. This ion implantation was performed at an energy of 20 keV and a dose of $3\times10^{15}$ atoms/cm$^2$.

In addition, the C hard mask was removed by RIE using oxygen gas. This RIE was performed at an antenna power of 100 W and a bias power of 100 W.

Figure 6:
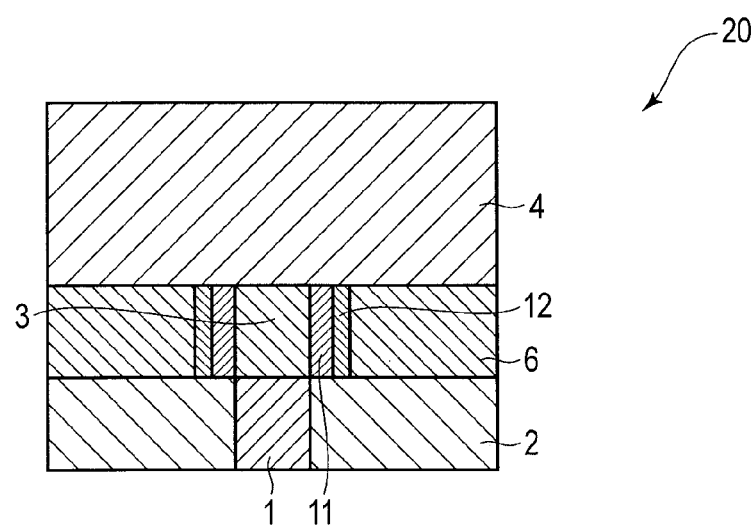
FIG. 6 is an exemplary view showing another magnetic recording head according to the embodiment.

FIG. 6 is an exemplary view showing another magnetic recording head according to the embodiment.

After that, as shown in FIG. 6, a side gap film 11 made of $Al_2O_3$ and an Ru underlayer 12 for plating were deposited by sputtering, a side shield film 6 was deposited by plating, and FeCoNi was formed as a write shield 4, thereby obtaining a magnetic recording head 20.

The track profile of the effective magnetic field of the obtained magnetic recording head 20 was checked.

Figure 7:
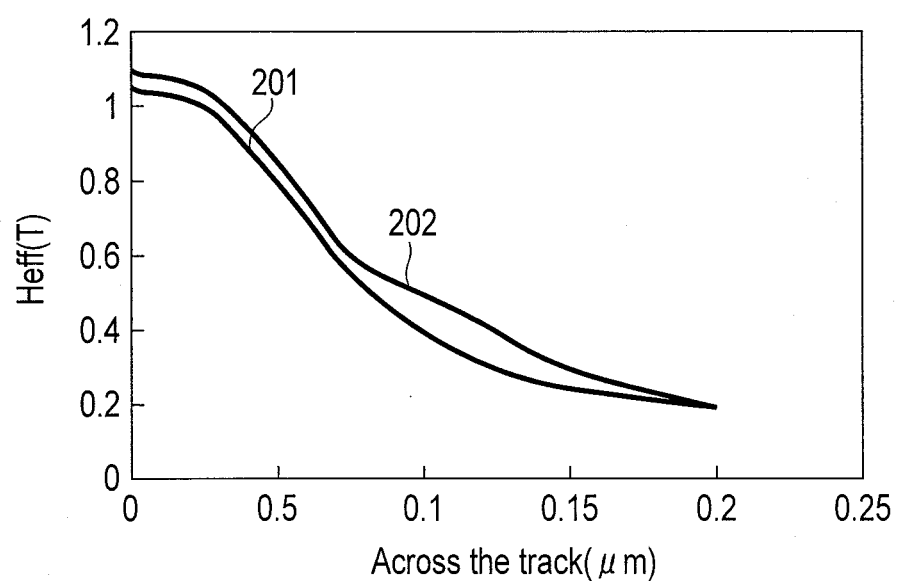
FIG. 7 is a graph showing other examples of the fringe characteristic of the magnetic recording head according to the embodiment.

FIG. 7 shows the simulation results of the fringe characteristic of the magnetic recording head 20.

The ordinate indicates an effective field intensity applied on a recording track, and the abscissa indicates the distance from the recording track.

In FIG. 7, reference numeral 201 denotes the characteristic when the main magnetic pole was patterned by IBE; and 202, the characteristic when ion implantation was performed on the main magnetic pole.

As shown in FIG. 7, even when ion implantation was performed on the main magnetic pole, the fringe characteristic equivalent to that obtained when the main magnetic pole layer was formed by IBE as will be described later in a comparative example was obtained.

Also, the R-Iw (resistance-recording current) characteristic of the obtained magnetic recording head was checked by applying a recording current by changing the STO driving current density by using a spinstand.

Table 1 (to be presented later) shows the result.

As shown in Table 1, a resistance rise resulting from microwave oscillation was found at $7\times10^7$ A/cm$^2$.

From the foregoing, the microwave magnetic head according to the embodiment was able to perform microwave oscillation with a low driving current without deteriorating the fringe characteristic. This demonstrates that in the microwave magnetic head according to the embodiment, stable oscillation of the STO on the main magnetic pole was possible.

EXAMPLE 2

A magnetic recording head was manufactured following the same procedures as in Example 1 except that ion implantation was performed using oxygen.

This ion implantation was performed at an energy of 20 keV and a dose of $3\times10^{15}$ atoms/cm$^2$.

When the R-Iw characteristic of the obtained magnetic recording head was checked, a resistance rise resulting from microwave oscillation was found at $8\times10^7$ A/cm$^2$ or less equivalent to that of Example 1.

Table 1 shows the result.

This indicates that in the microwave magnetic head according to Example 2, stable oscillation of the STO on the main magnetic pole was possible.

EXAMPLE 3

A magnetic recording head was manufactured following the same procedures as in Example 1 except that ion implantation was performed using boron.

This ion implantation was performed at an energy of 20 keV and a dose of $3\times10^{15}$ atoms/cm$^2$.

When the R-Iw characteristic of the obtained magnetic recording head was checked, a resistance rise resulting from microwave oscillation was found at $8\times10^7$ A/cm$^2$ or less equivalent to that of Example 1.

Table 1 shows the result.

This reveals that in the microwave magnetic head according to Example 3, stable oscillation of the STO on the main magnetic pole was possible.

EXAMPLE 4

A magnetic recording head was manufactured following the same procedures as in Example 1 except that ion implantation was performed using fluorine.

This ion implantation was performed at an energy of 20 keV and a dose of $3\times10^{15}$ atoms/cm$^2$.

When the R-Iw characteristic of the obtained magnetic recording head was checked, a resistance rise resulting from microwave oscillation was found at $7\times10^7$ A/cm$^2$ or less equivalent to that of Example 1.

Table 1 shows the result.

This shows that in the microwave magnetic head according to Example 4, stable oscillation of the STO on the main magnetic pole was possible.

COMPARATIVE EXAMPLE 1

A microwave-assisted magnetic recording head was manufacturing following the same procedures as in Example 1 except that the main magnetic pole was etched by IBE instead of performing the modification step shown in FIG. 2C.

This IBE of the main magnetic pole was performed at an acceleration voltage of 300 V and a beam angle of 50° in the same manner as that for the STO layer.

EDX analysis revealed that the redeposited product on the STO sidewalls mainly contained CoFe as the main magnetic pole material.

When the R-Iw characteristic of the obtained magnetic recording head was checked, a resistance rise resulting from microwave oscillation was found at $2\times10^8$ A/cm$^2$. That is, when compared to Examples 1 to 4, the current density at the start of oscillation was high, so microwave oscillation hardly occurred.

Table 1 below shows the result.

TABLE 1

| | Modification ion | Oscillation start current density (A/cm$^2$) |
|---|---|---|
| Example 1 | Nitrogen | $7 \times 10^7$ |
| Example 2 | Oxygen | $8 \times 10^7$ |
| Example 3 | Boron | $8 \times 10^7$ |
| Example 4 | Fluorine | $7 \times 10^7$ |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording head manufacturing method comprising:
   forming a spin torque oscillator layer on a main magnetic pole layer;
   forming a mask on the spin torque oscillator layer;
   processing the spin torque oscillator layer by performing ion beam etching on the spin torque oscillator layer through the mask; and
   decreasing a saturation flux density by partially modifying the main magnetic pole layer through the mask to form an unmodified main magnetic pole portion covered with the mask, and a modified portion around the main magnetic pole.

2. The method according to claim 1, wherein the main magnetic pole layer in the modified portion has a saturation flux density of not more than 5 kG.

3. The method according to claim 1, wherein the modifying the main magnetic pole layer is performed using at least one ion selected from the group consisting of fluorine, chlorine, bromine, oxygen, nitrogen, and boron.

4. The method according to claim 1, further comprising forming a cap layer made of a nonmagnetic metal material on the spin torque oscillator layer, before the forming the mask on the spin torque oscillator layer.

5. The head according to claim 1, wherein the modified portion has a saturation flux density of not more than 5 kG.

6. A magnetic recording head comprising:
   a main magnetic pole portion;
   a modified portion formed around the main magnetic pole portion by modifying the same material as that of the main magnetic pole portion by using at least one ion selected from the group consisting of fluorine, chlorine, bromine, oxygen, nitrogen, and boron such that a saturation flux density decreases; and
   a spin torque oscillator layer formed on the main magnetic pole portion.

7. A magnetic head assembly comprising:
   a magnetic recording head comprising
   a main magnetic pole portion,
   a modified portion formed around the main magnetic pole portion by modifying the same material as that of the main magnetic pole portion by using at least one ion selected from the group consisting of fluorine, chlorine, bromine, oxygen, nitrogen, and boron such that a saturation flux density decreases, and
   a spin torque oscillator layer formed on the main magnetic pole portion;
   a head slider on which the magnetic recording head is mounted;
   a suspension having one end on which the head slider is mounted; and
   an actuator arm connected to the other end of the suspension.

8. The assembly according to claim 7, wherein the modified portion has a saturation flux density of not more than 5 kG.

9. A magnetic recording/reproduction apparatus comprising:
   a magnetic recording medium; and
   a magnetic head assembly comprising
   a magnetic recording head comprising a main magnetic pole portion, a modified portion formed around the main magnetic pole portion by modifying the same material as that of the main magnetic pole portion by using at least one ion selected from the group consisting of fluorine, chlorine, bromine, oxygen, nitrogen, and boron such that a saturation flux density decreases, and a spin torque oscillator layer formed on the main magnetic pole portion,
   a head slider on which the magnetic recording head is mounted,
   a suspension having one end on which the head slider is mounted, and
   an actuator arm connected to the other end of the suspension.

10. The apparatus according to claim 9, wherein the modified portion has a saturation flux density of not more than 5 kG.

\* \* \* \* \*